United States Patent
Braeutigam

(10) Patent No.: US 8,998,137 B2
(45) Date of Patent: Apr. 7, 2015

(54) CONNECTING ELEMENT AND FASTENING ARRANGEMENT FOR SEAT RAILS IN AN AIRCRAFT

(75) Inventor: Stefan Braeutigam, Cham (CH)

(73) Assignee: Premium Aerotec GmbH, Augsburg (DE)

( * ) Notice: Subject to any disclaimer, the term of this patent is extended or adjusted under 35 U.S.C. 154(b) by 202 days.

(21) Appl. No.: 13/640,183

(22) PCT Filed: Apr. 7, 2011

(86) PCT No.: PCT/DE2011/000376
§ 371 (c)(1),
(2), (4) Date: Dec. 19, 2012

(87) PCT Pub. No.: WO2011/124215
PCT Pub. Date: Oct. 13, 2011

(65) Prior Publication Data
US 2013/0216300 A1 Aug. 22, 2013

(30) Foreign Application Priority Data

Apr. 9, 2010 (DE) .......................... 10 2010 014 301

(51) Int. Cl.
| | | |
|---|---|---|
| B64D 11/00 | (2006.01) |
| F16B 1/00 | (2006.01) |
| F16B 9/00 | (2006.01) |
| B64C 1/18 | (2006.01) |
| B64C 1/26 | (2006.01) |
| F16B 5/00 | (2006.01) |
| F16B 12/50 | (2006.01) |

(52) U.S. Cl.
CPC ... B64C 1/18 (2013.01); B64C 1/26 (2013.01); F16B 5/00 (2013.01); F16B 12/50 (2013.01); F16B 1/00 (2013.01)

(58) Field of Classification Search
CPC .............. F16B 12/50; F16B 5/00; F16B 1/00; B64C 1/26; B64C 1/69; B64C 1/18
USPC ............... 244/117 R, 131, 119, 123.1, 118.1, 244/118.2, 118.5; 403/408.1, 217, 219, 403/258, 260, 262, 205
See application file for complete search history.

(56) References Cited

U.S. PATENT DOCUMENTS

| | | |
|---|---|---|
| 7,195,418 B2 | 3/2007 | Durand et al. |
| 7,338,013 B2 | 3/2008 | Vetillard et al. |

FOREIGN PATENT DOCUMENTS

| | | |
|---|---|---|
| DE | 3442550 C1 | 6/1986 |
| DE | 3838220 A1 | 5/1990 |
| DE | 20114953 U1 | 12/2001 |
| DE | 10329017 A1 | 1/2005 |
| EP | 0217312 A2 | 4/1987 |
| EP | 1614625 A1 | 1/2006 |
| EP | 1619116 A1 | 1/2006 |

OTHER PUBLICATIONS

European Patent Office, International Search Report in International Patent Application No. PCT/DE2011/000376 (Sep. 21, 2011).

Primary Examiner — Valentina Xavier
(74) Attorney, Agent, or Firm — Leydig, Voit & Mayer, Ltd.

(57) ABSTRACT

A connecting element includes a first leg, a second leg and a third leg that are connected to each other and are each disposed at an angle to each other. The first leg includes a first fastening section and the second leg includes a second fastening section. A bending edge is disposed between the first leg and the second leg. The first leg includes at least one supporting section adjacent to the first section in a direction parallel to the bending edge, with the supporting section being connected to the second leg. The second leg forms an extension part in the first direction that is adjacent to the second fastening section, has a free end and is longer than the first fastening section of the first leg. The third leg is connected to the first leg and to the second leg.

20 Claims, 3 Drawing Sheets

CONNECTING ELEMENT AND FASTENING ARRANGEMENT FOR SEAT RAILS IN AN AIRCRAFT

CROSS REFERENCE TO RELATED APPLICATIONS

This application is a U.S. National Phase application under 35 U.S.C. §371 of International Application No. PCT/DE2011/000376, filed on Apr. 7, 2011, and claims benefit to German Patent Application No. DE 10 2010 014 301.4, filed on Apr. 9, 2010. The International Application was published in German on Oct. 13, 2011, as WO 2011/124215 A1 under PCT Article 21 (2).

FIELD

The present invention relates to a connecting element comprising at least three legs arranged at an angle to each other and to a fastening arrangement having such a connecting element.

BACKGROUND

Such connecting elements and fastening arrangements are used particularly in lightweight constructions, for example in aircraft construction. A sample field of application is the connection of seat rails to transverse beams of a floor in an aircraft. In the same way, other rails, for example guide or securing rails in an aircraft hold, can be connected to corresponding transverse beams.

The prior art substantially specifies two alternative connection concepts for connecting the usual support structures for floors in aircraft (seat rails in the longitudinal direction of the aircraft and transverse floor beams in the transverse direction of the aircraft), the seat rails and transverse beams being designed as H beams or C beams in this case:

a) The seat rails extend above the transverse floor beams. The lower flange of a seat rail is connected to the upper flange of a transverse beam by screws or rivets. A disadvantage of this type of seat rail fastening is the relatively great construction height required for this floor structure.

b) The seat rail is partially notched in the region where it is connected to the transverse beam, i.e. furnished with a lower recess in which the transverse beam engages. However, the stability of the seat rail is considerably weakened due to this recess, with the result that it can then only transfer minimal transverse forces and normal forces. In order to compensate for this weakness, complex connection elements must be provided which are able to transfer the transverse and normal forces which are applied via the seats and the load on the seats into the seat rail over the notched region. Even if the main bending moments in the seat rail arise in the middle between two transverse beams, the bending moments are not reduced to zero in the notched area, with the result that the upper flange of the seat rail, along with the top of the seat rail, is not usually able to transfer the moments which arise in this area. Relatively low bending moments also need to be transferred in this case by the connection elements or by a connection member bridging the notched region.

In the past different, concepts were developed for connection elements and connection members. In one of these concepts the transverse floor beam in the region of the connection to a seat rail is furnished with a local penetration through which a connecting element is passed. This connecting element is then connected securely, for example riveted, to the seat rail on both sides of the recess. A structure is created in this manner in which the seat rail and the transverse beam engage with one another.

Flange bending of the transverse beam may arise with connection concept a) in the region where a seat rail is connected to the transverse beam and where the force is thus applied to the transverse beam, especially if transverse floor beams are designed to be extremely weight-saving, resulting in local strength problems in the transverse beam.

The problem of flange bending may arise in particular if transverse floor beams are produced from anisotropic materials, e.g. carbon fibre composite material (CFRP). The main loads on transverse floor beams arise in the y/z plane. Transverse beams made from anisotropic materials are therefore primarily made with sufficient rigidity to withstand this load. However, bending of the upper flange of the transverse beam around a transverse axis (y axis) occurs locally in the region where the seat rail is connected. To absorb this effect, angles may be attached to reinforce the region on the transverse beam or the transverse beam component is made rigid in local areas in order to withstand these loads. Both solutions require additional process steps which result in increased manufacturing costs. The structural weight of these local reinforcements must also be taken into account.

A further problem is that weight-optimised lightweight transverse beams tend to tilt in regions in which a flange is exposed to a compressive load. As the upper flanges are generally supported at the sides by the seat rail connections, the unsupported lower flange is especially at risk of tilting. In this case the lower flange slips forwards or backwards (in the longitudinal direction of the aircraft). Therefore, to enable weight-optimised transverse beams to be used in the floor of an aircraft, additional elements are often fitted into the aircraft floor to counteract this tilting effect. These elements also represent additional weight and increase installation costs.

A connecting element is described in DE 201 14 953 U1 which comprises a basic body in the shape of an equilateral triangle, a triangular fastening strap being arranged on each edge of this triangle by means of material bridges. The connecting line for the respective material bridges forms a bending edge.

This connecting element becomes a corner connector for a frame after bending down the fastening straps. The individual fastening straps are only connected to the basic body by means of the material bridges in each case. The fastening straps are not intended to be connected directly to one another.

A connection shoe which has a C-shaped cross-section for sheet metal profiles which are also C-shaped is known from DE 34 42 550 C1. This connection shoe has a strap on its front face at one end, this strap being bent downwards from the middle profile section, i.e. towards the two side legs. The C-shaped profile body of the connecting element is inserted into a C-shaped profile element. A further C-shaped profile element is then placed at right angles to the first profile element and flat against this element, the section of the connection shoe protruding out of the first profile element engaging with the second profile element and the vertically bent strap of the connection shoe coming into two-dimensional contact with the middle profile section of the second profile element. No dedicated fastening sections are provided for the connection shoe to be securely connected to the profile elements by fastening means.

A support construction made from rectangular hollow profiles is known from DE 103 29 017 B4, these profiles being connected to each other by means of external or internal connecting elements. In this case the hollow profiles face each other, but do not penetrate each other.

A connection between a post and beam described for use in facades from DE 38 38 220 C2, in which the transverse beam is inserted in a partially recessed post from two sides and connected to the post by a sort of dowel mechanism.

SUMMARY

In an embodiment, the present invention provides a connecting element including a first leg, a second leg and a third leg that are connected to each other and are each disposed at an angle to each other. The first leg includes a first fastening section and the second leg includes a second fastening section. A bending edge is disposed between the first leg and the second leg. The first leg includes at least one supporting section adjacent to the first section in a direction parallel to the bending edge, with the supporting section being connected to the second leg. The second leg forms an extension part in the first direction that is adjacent to the second fastening section, has a free end and is longer than the first fastening section of the first leg. The third leg is connected to the first leg and to the second leg.

BRIEF DESCRIPTION OF THE DRAWINGS

Exemplary embodiments of the invention are described and explained below in greater detail with reference to the attached drawings, in which.

DETAILED DESCRIPTION

Figure 1:
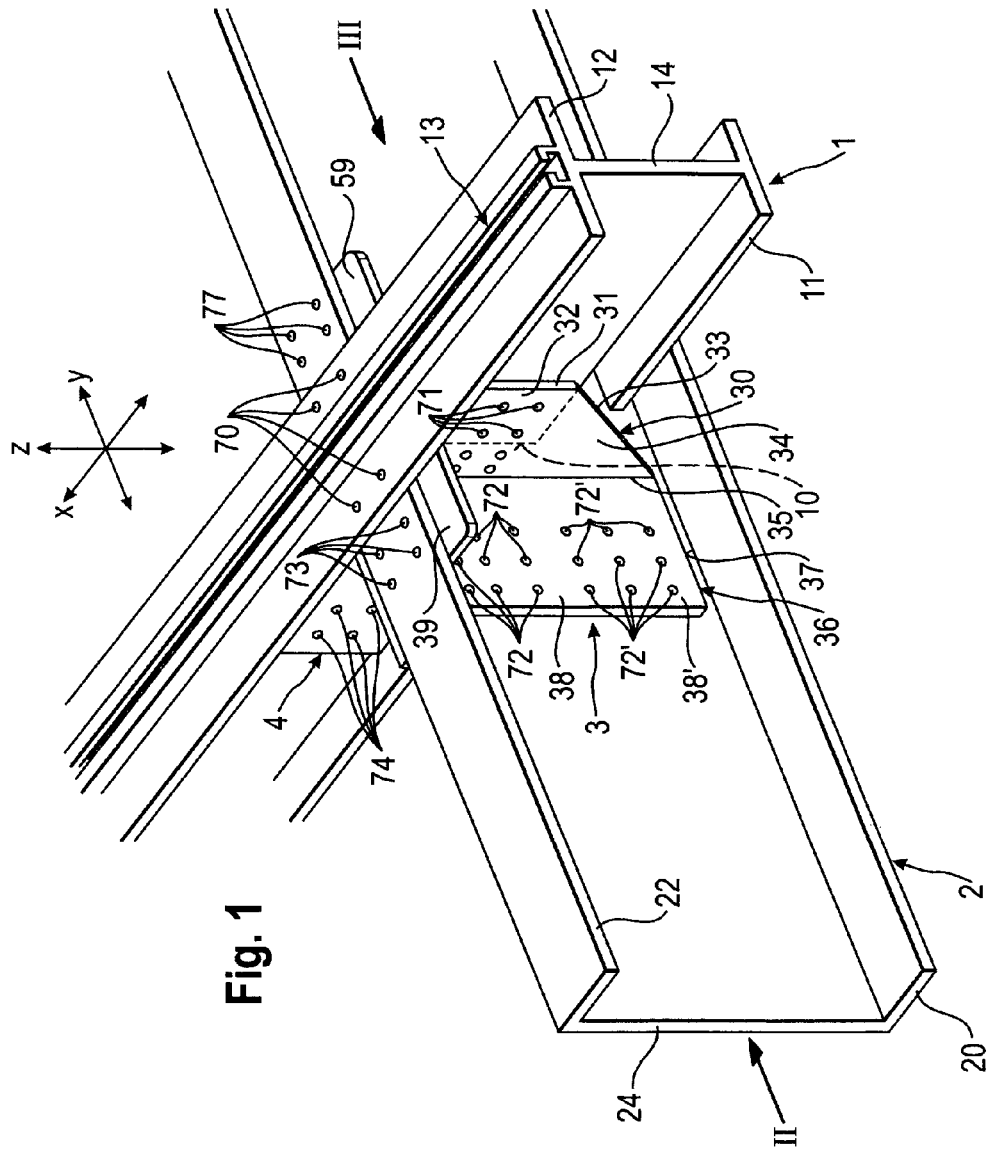
FIG. 1 is a perspective view of a connecting section between a first structural element and a second structural element having a fastening arrangement according to the invention.

In an embodiment, the present invention provides a generic connecting element which can be connected to two structural elements arranged at an angle to each other in order to connect these elements, so as to permit an adequate and effective transmission of transverse forces and normal forces and a transfer of bending moments along with a low construction height even if the structural elements at least partially penetrate each other, and in so doing prevent flange bending and tilting of one structural element in the longitudinal direction of the other structural element.

The fastening arrangement according to embodiments of the invention to connect two structural elements arranged at an angle to each other comprises a connecting element and is particularly intended for a lightweight construction. The first structural element comprises a recess into which the second structural element engages at least in part, a first fastening section of a first leg of the first connecting element designed according to the invention resting on the first structural element on one side of the recess and being connected to this structural element. A fastening section of a second leg of the first connecting element rests against the second structural element and is connected to this structural element. A second connecting element designed as an angle is provided on the side of the second structural element facing away from the first connecting element. The second connecting element is connected both to the first structural element and to the second structural element.

In a preferred embodiment of the invention, the supporting section is connected to the extension part in the first direction over a region covering more than half the extent of this extension part. The supporting section preferably extends up to the free end of the extension part. As a result of these measures, the tilting moments which arise around the transverse axis in a second structural element connected to the connecting element are in each case reliably supported by the first leg of the first connecting element and passed into a first structural element connected to the connecting element.

In another preferred embodiment of the invention, the supporting section is connected to the fastening section over a region covering more than half the extent of the fastening section of the first leg in a second direction, which extends at right angles to the bending edge and in the x-z plane of the fastening section of the first leg. This connection preferably extends substantially over the whole extent of the fastening section in the second direction. This structural measure means that the forces generated by the tilting forces arising in the second structural element are passed particularly effectively and to an optimum extent from the supporting section into the fastening section and from here into the first structural element.

In a further preferred embodiment of the invention, the third leg is integrally connected to the first leg and to the second leg. This integral design of the first connecting element as a corner angle in the form of a box corner creates a particularly stable connecting part.

The third leg in this case extends in a plane which preferably extends at right angles to the planes of the first leg and the second leg.

It is also advantageous if the supporting section is designed so that an edge of the supporting section facing away from the fastening section extends from the free end of the first leg to the free end of the extension part of the fastening section of the second leg. This edge preferably extends in a straight line; however it may also extend in a curve, for example. The resulting bevel on the supporting section leads to material savings and thus reduces the weight of this component.

In a particularly preferred embodiment of the invention, the three legs of the connecting element are designed in one piece, the connecting element preferably being manufactured as a forged or cast part. This can minimise or even avoid the use of time-consuming and expensive machining operations when manufacturing the connecting element, especially when using titanium as a very light material.

The part of the object concerned with the fastening arrangement is achieved by the fastening arrangement specified in claim 7.

Providing the first connecting element and the second connecting element which are both connected to the first structural element and to the second structural element, which may for example be achieved by rivets, screws and/or by bonding, makes it unnecessary to attach a connection member as is usual in the prior art to bridge the notched region of the first structural element and which penetrates the second structural element via an opening. It is thus not necessary to provide an opening in the second structural element at this point, which means that the second structural element is not weakened at this point. The supporting section on the first leg supports the tilting forces which may possibly arise at this point in the second structural element and passes these into the first structural element, such as to prevent slippage of the lower flange of the second structural element in the x direction as described in conjunction with the prior art. The third leg extends in a plane which preferably extends at right angles to the planes of the first leg and the second leg. This third leg acts as an angle reinforcement for the second structural element together with the second leg of the first connecting element, thus reliably preventing the flange bending in this region as described in conjunction with the prior art.

The solution according to embodiments of the invention provides a secure connection between the first structural element and the second structural element which bridges the recess in the first structural element without an additional connection member. In addition, the second structural element is reinforced by the first connecting element in the region of the connection point with the first structural element. The first connecting element thus fulfils three tasks in the assembled state, i.e.:

it stiffens the first structural element in the region of the recess together with the second connecting part;

it prevents flange bending in the second structural element and it provides tilt support to prevent tilting of the second structural element around a transverse axis.

In a preferred development, the third leg is connected to the second structural element, preferably to an upper flange of the second structural element, and acts as an angle reinforcement for the second structural element together with the second leg of the first connecting element, thus even more reliably preventing flange bending in this region as described in conjunction with the prior art.

In a further optimised embodiment of the fastening arrangement according to the invention, a third connecting element, preferably in the form of a corner angle, is provided on the side of the first structural element facing away from the first connecting element, the third connecting element being connected both to the first structural element and to the second structural element. As a result a secure connection is also produced between the first and second structural elements on the side of the first structural element facing away from the first connecting element. The third connecting element may also be furnished with a third leg, like the first connecting element, this leg being connected to the upper flange of the second structural element.

An even further improved embodiment of the fastening arrangement is characterised in that a fourth connecting element designed as an angle or a corner angle is provided on the side of the first structural element facing away from the second connecting element and in that the fourth connecting element is connected both to the first structural element and to the second structural element. In this way a further secure connection is created between the first structural element and the second structural element.

In an advantageous embodiment of the invention, the second connecting element and/or the third connecting element and/or the fourth connecting element is/are designed in the same way as the first connecting element and is/are connected to the two structural elements.

A preferred application of the fastening arrangement according to the invention is characterised in that the first structural element is a seat rail and the second structural element is a transverse beam of a floor or intermediate floor in an aircraft. However, the first structural element may also be a different guide rail or fastening rail, e.g. in the hold of an aircraft, instead of a seat rail.

FIG. 1 is a perspective view of the intersection between two crossing structural elements 1, 2.

In the illustrated example, the first structural element 1 is the seat rail on a floor in a passenger aircraft. This seat rail is designed as an H beam having a horizontal lower flange 11, an upper flange 12 which extends horizontally and a vertical rail 14 extending between the lower flange 11 and the upper flange 12. The top of the seat rail 13 is arranged on the upper side of the upper flange 12 facing away from the vertical rail 14, corresponding engaging elements being mounted in a movable and lockable fashion on the underside of a seat in the top of this seat rail in a manner known per se. The first structural element 1 designed as a seat rail extends in the longitudinal direction of the aircraft x.

Second structural elements 2 designed as transverse floor beams extend transversely with respect to the seat rail, these structural elements being supported on the aircraft fuselage structure and themselves serving as supports for the seat rails, i.e. for the first structural elements 1. The second structural elements 2 thus extend in the transverse direction of the aircraft y. The second structural elements may either also be designed as H beams in cross section or they may, as shown in FIG. 1, comprise a C-shaped cross-section, i.e. a U-shape lying on its side. Such a second structural element 2 is furnished with a lower flange 20, an upper flange 22 and a vertical rail 24 which extends between the lower flange 20 and the upper flange 22.

The transverse floor beam penetrates the seat rail which is furnished with a recess 10 on its underside for this purpose in the connection region between the first structural element 1 designed as a seat rail and the second structural element 2 designed as a transverse floor beam. The lower flange 11 and the vertical rail 14 of the first structural element 1 are interrupted and form a gap through which the second structural element 2 can pass in the region of the recess 10. In this case the upper flange 12 of the seat rail rests on the upper flange 22 of the second structural element 2 designed as a transverse floor beam. The upper flange 12 and the upper flange 22 are securely connected to each other in this region by means of rivets 70. Any other connecting means, such as screws, for example, may of course also be used instead of rivets and the two flanges 12, 22 may alternatively or additionally be bonded together. These alternative or additional connection types (e.g. screws or bonding) may also be provided alternatively or additionally for the other riveted joints mentioned in this description.

As can be seen in FIG. 1 and in the side view in FIG. 2, a first connecting element 3 designed as a corner connector, such as a box corner, is provided between the first structural element 1 and the second structural element 2 and connected to these elements in the manner described below.

The first connecting element 3 comprises a first leg 30, which extends in the x-z plane, the z direction corresponding to the vertical axis of the aircraft, and which rests at least partially on the vertical rail 14 of the first structural element 1 with a fastening section 32 and is connected to this structural element by means of rivets 71.

The first connecting element 3 comprises a second leg 36 extending in the y-z plane and rests on the vertical rail 24 of the second structural element 2 and is securely connected to this structural element by means of rivets 72. The second leg 36 extends in direction z towards the bending edge 35 between the first leg 30 and the second leg 36 even lower than the fastening section 32 of the first leg 30 furnished with rivets 71. The first leg 30 is furnished with a supporting section 34 beneath the fastening section 32, this supporting section also extending in the x-z plane and having a roughly triangular shape, one edge of the triangle being formed by part of the bending edge 35. A free edge 33 of the supporting section 34 extends from a free end 31 of the first leg 30 to the lower free end 37 of the second leg 36.

The fastening section 38 of the second leg 36 is thus longer in the z direction than the fastening section 32 of the first leg 30 and thus comprises an extension part 38' in its lower section which is also connected by rivets 72' to the vertical rail 24 of the second structural element 2.

A third leg 39 of the first connecting element 3 extends in the x-y plane and rests on the upper flange 22 of the second structural element 2 from beneath. It is securely connected to the upper flange 22 by means of rivets 73 at this point. In this way, the first connecting element 3 acts as a reinforcement for the upper flange 22 of the second structural element 2 and thus prevents flange bending of the upper flange 22 in this region. The upper leg 39 of the first connecting element 3 is integrally connected to the first leg 30 and to the second leg 36.

A second connecting element 4 which is designed as an angle is provided on the side of the second structural element 2 facing away from the first connecting element 3. A first leg 40 of this second connecting element 4 extends in the x-z plane and rests on the vertical rail 14 of the first structural element 1 and is connected to this structural element by means of rivets 74. A second leg 42 of the second connecting element 4 lies in the y-z plane and rests on the rear side of the vertical rail 24 of the second structural element 2 facing away from the first connecting element 3. The riveted joints 72 which connect the upper part of the fastening section 38 of the first connecting element 3 to the second structural element 2 also penetrate the second leg 42 of the second connecting element 4 and likewise connect these to the second structural element. In this way, a secure and continuous connection is formed from the first leg 40 of the second connecting element 4 via the second leg 42 of this connecting element, the vertical rail 24 of the second structural element 2, the second leg 36 of the first connecting element 3 and its first leg 30 which bridges the recess 10 in the first structural element 1 and thus forms a non-positive connection to transfer the forces extending in the first structural element 1 over the recess 10.

Figure 2:
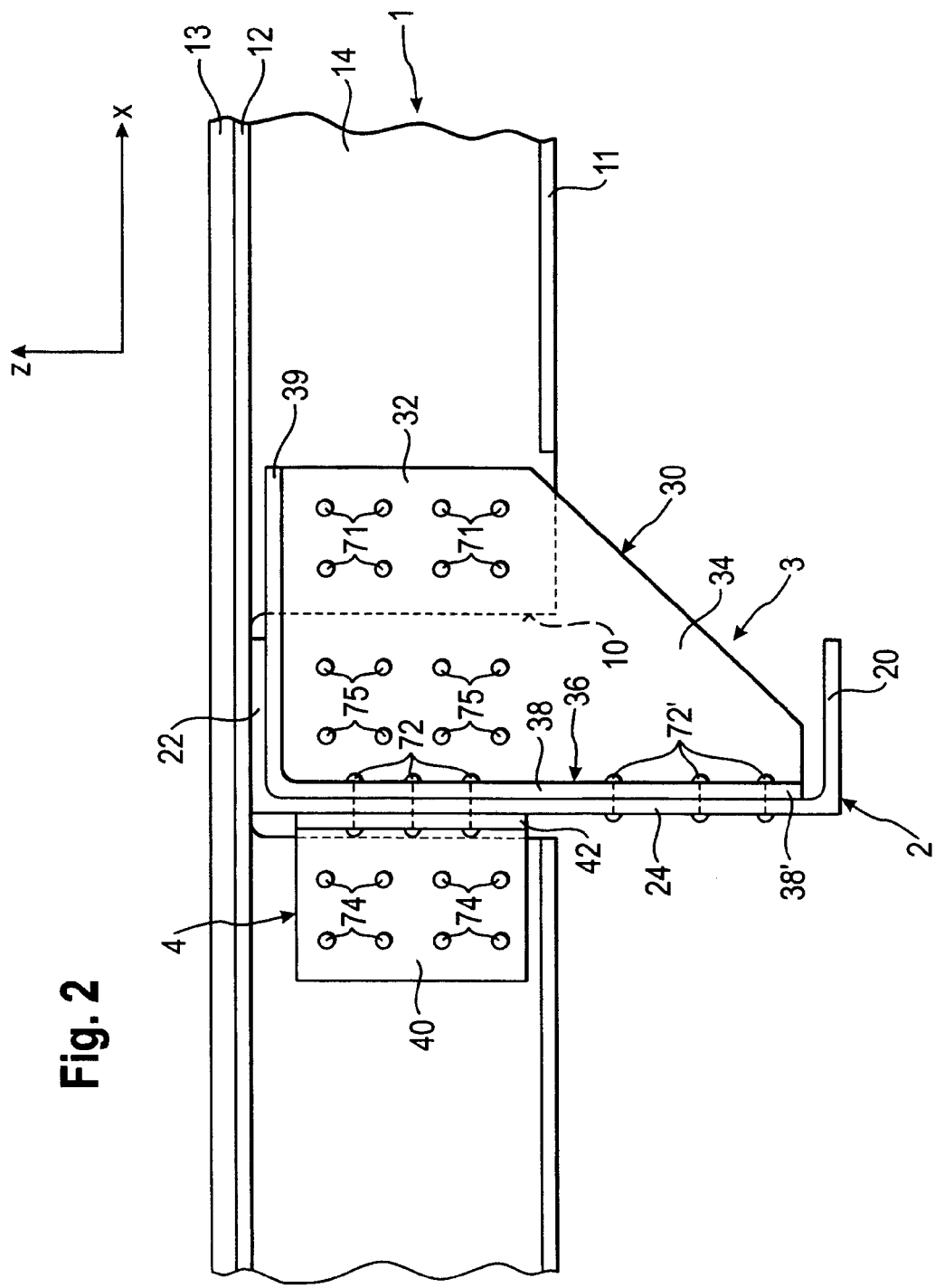
FIG. 2 is a view of the fastening arrangement from FIG. 1 in the direction of arrow II.
Figure 3:
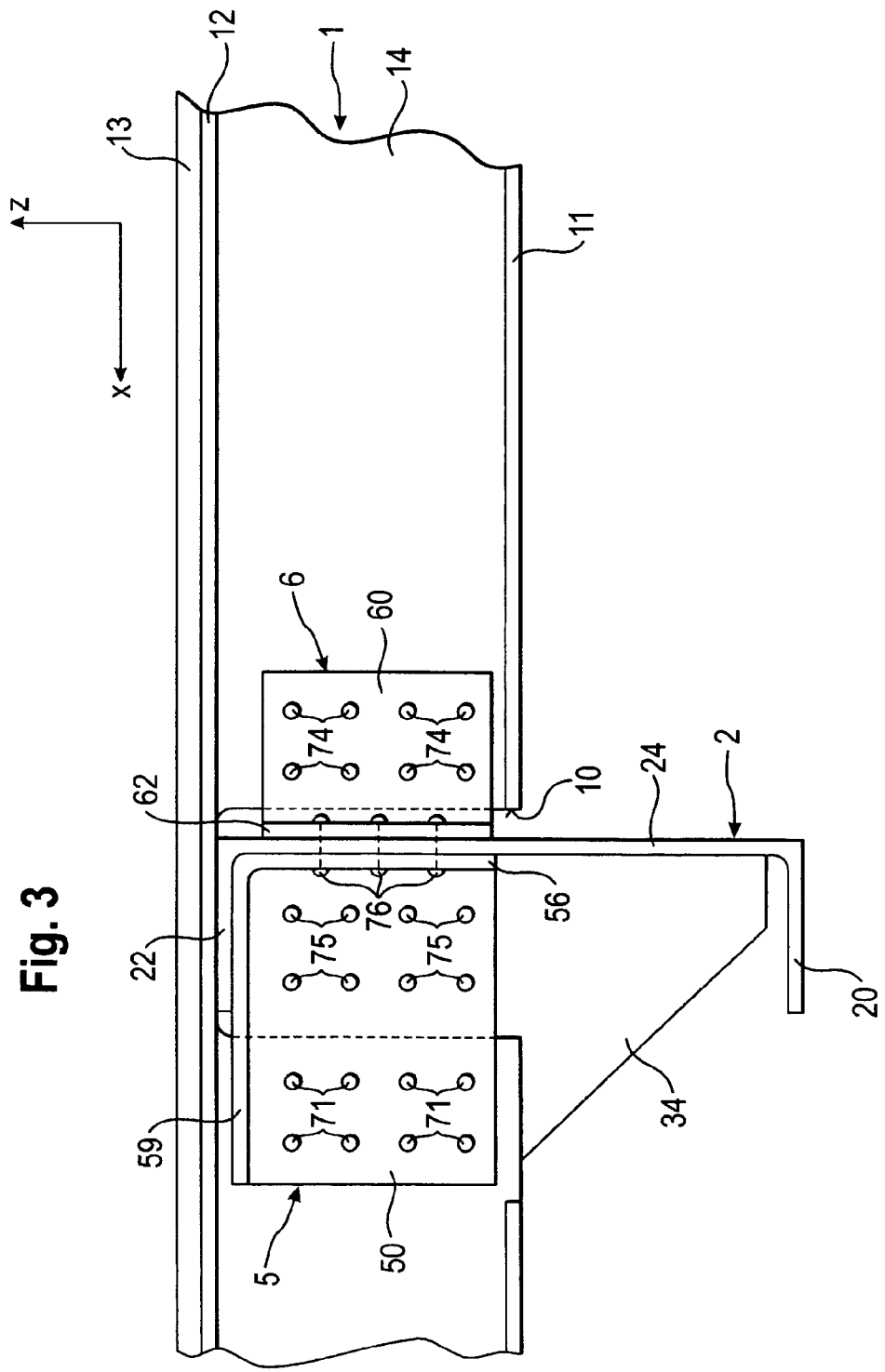
FIG. 3 is a view of the fastening arrangement from FIG. 1 in the direction of arrow III.

FIG. 3 shows the connecting elements 5, 6 lying on the rear side of the first structural element 1 in contrast to FIG. 2.

A third connecting element 5 is provided on the side of the first structural element 1 facing away from the first connecting element 3. This third connecting element 5 is also furnished with a first leg 50, a second leg 56 and a third leg 59 as a corner angle. Its structure corresponds to a mirror image of the first connecting element 3, but it is not necessarily furnished with a supporting section like the supporting section 34 of the first connecting element 3. This can be provided, but has been omitted in the third connecting element 5 for weight-saving reasons, for example. The third connecting element 5 is securely connected to the first structural element 1 and the first connecting element 3 by means of rivets 71 which connect the first leg 32 of the first connecting element 3 to the first structural element 1 and also penetrate the first leg 50 of the third connecting element 5. The first connecting element 3 and the third connecting element 5 are connected directly to each other by means of rivets 75 in the region of the recess 10 in the first structural element 1.

The second leg 56 of the third connecting element 5 extends in the y-z plane and rests on the vertical rail 24 of the second structural element 2 and is securely connected to this structural element by means of rivets 76.

The third leg 59 of the third connecting element 5 extends in the x-y plane and rests on the upper flange 22 of the second structural element 2 from beneath. The third leg 59 and the upper flange 22 are securely connected to each other by means of rivets 77. Once again, the second leg 56 and the third leg 59 of the third connecting element act as reinforcements for the upper flange 22 in this case and prevent flange bending at this point.

A fourth connecting element 6 is provided on the rear side of the vertical rail 24 of the second structural element 2 facing away from the third connecting element 5. This fourth connecting element 6 is also designed as an angle profile as a mirror image of the second connecting element 4. A first leg 60 of the fourth connecting element 6 rests on the vertical rail 14 of the first structural element and is securely connected to both the first structural element 1 and the second connecting element 4 at this point by means of rivets 74 which connect the second connecting element 4 to the first structural element 1 and which penetrate the first leg 60 of the fourth connecting element 6.

The second leg 62 which extends in the y-z plane rests on the rear side of the vertical rail 24 of the second structural element 2 and is securely connected both to the second structural element 2 and to the third connecting element 5 by means of the rivets 76 provided at this point. A continuous non-positive connection is also created in this manner on this side of the first structural element which bridges the recess 10 in the first structural element 1.

Whilst the first and third connecting elements which are designed as corner angles are formed from forged or cast sections, preferably made from titanium, the second and fourth connecting elements have single angles which merely need to be cut out of one angle profile. This thus saves considerable production costs especially if these angle profiles are made from titanium, which is preferable for weight reasons.

Reference numerals in the claims, the description and the drawings are provided solely to facilitate understanding of the invention and should not restrict the scope of protection.

LIST OF REFERENCE NUMERALS

These are as follows:
1 first structural element
2 second structural element
3 first connecting element
4 second connecting element
5 third connecting element
6 fourth connecting element
10 recess
11 lower flange
12 upper flange
13 top of the seat rail
14 vertical rail
20 lower flange
22 upper flange
24 vertical rail
30 first leg
31 free end of 30
32 fastening section
33 edge
34 supporting section
35 bending edge
36 second leg
37 free end of 39
38 fastening section
38' extension part
39 third leg
40 first leg
42 second leg
50 first leg
56 second leg 59 third leg
60 first leg
62 second leg
70 rivets
71 rivets
72 rivets
74 rivets
75 rivets
76 rivets
77 rivets
z first direction/vertical direction
x second direction/longitudinal direction of the aircraft
y transverse direction of the aircraft

The invention claimed is:

1. A connecting element comprising:
a first leg including a first fastening section;
a second leg disposed at an angle to the first leg and including a second fastening section;
a bending edge disposed between the first leg and the second leg, the first leg including at least one supporting section adjacent to the first fastening section in a first direction parallel to the bending edge and being connected to the second leg, the second leg forming an extension part in the first direction that is adjacent to the second fastening section, has a free end and is longer than the first fastening section of the first leg; and
a third leg connected to the first leg and to the second leg.

2. The connecting element recited in claim 1, wherein the supporting section is connected to the extension part in the first direction over a region covering more than half of an extent of the extension part.

3. The connecting element recited in claim 2, wherein the supporting section extends to the free end of the extension part.

4. The connecting element recited in claim 1, wherein the supporting section is connected to the first fastening section over a region covering more than half of an extent of the first fastening section of the first leg in a second direction, which extends at right angles to the bending edge and in the x-z plane of the first fastening section of the first leg.

5. The connecting element recited in claim 4, wherein the supporting section is connected to the first fastening section over substantially an entire extent of the first fastening section in the second direction.

6. The connecting element recited in claim 1, wherein the first leg, the second leg and the third leg are integrally formed in one piece.

7. The connecting element recited in claim 6, wherein the one piece is one of forged or cast.

8. The connecting element recited in claim 1, wherein an edge of the supporting section that faces away from the first fastening section extends from a free end of the first leg to the free end of the extension part of the second fastening section of the second leg.

9. The connecting element recited in claim 1, wherein an edge of the supporting section that faces away from the first fastening section extends from a free end of the first leg to the free end of the extension part of the second fastening section of the second leg in a straight line.

10. The connecting element recited in claim 1, wherein the first second and third legs are arranged at right angles to each other.

11. A fastening arrangement for connecting two structural elements that are disposed at an angle to each other, the fastening arrangement comprising:
a first structural element including a recess;
a second structural element disposed at an angle to the first structural element and at least partially engaging in the recess of the first structural element;
a first connecting element including:
a first leg having a first fastening section resting on the first structural element on a first side of the recess and being connected to the first structural element,
a second leg disposed at an angle to the first leg and including a second fastening section resting on the second structural element and being connected to the second structural element,
a bending edge disposed between the first leg and the second leg, the first leg including at least one supporting section adjacent to the first fastening section in a first direction parallel to the bending edge and being connected to the second leg, the second leg forming an extension part in the first direction that is adjacent to the second fastening section, has a free end and is longer than the first fastening section of the first leg, and
a third leg connected to the first leg and to the second leg; and
a second connecting element formed as an angle and disposed on a side of the structural element facing away from the first connecting element, the second structural element being connected to both the first structural element and the second structural element.

12. The fastening arrangement recited in claim 11, wherein the third leg of the first connecting element is connected to the second structural element.

13. The fastening arrangement recited in claim 11, further comprising a third connecting element dispose don a side of the first structural element facing away from the first connecting element, the third connecting element being connected to both the first structural element and the second structural element.

14. The fastening arrangement recited in claim 13, wherein the third connecting element is formed as an angle.

15. The fastening arrangement recited in claim 13, further comprising a fourth connecting element formed as an angle and disposed on a side of the first structural element facing away from the second connecting element, the fourth connecting element being connected to both the first structural element and to the second structural element.

16. The fastening arrangement recited in claim 11, wherein the second connecting element has a same design as the first connecting element and is connected to each of the first and second structural elements.

17. The fastening arrangement recited in claim 13, wherein at least one of the second connecting element or the third connecting element has a same design as the first connecting element and is connected to each of the first and second structural elements.

18. The fastening arrangement recited in claim 15, wherein at least one of the second connecting element, the third connecting element or the fourth connecting element has a same design as the first connecting element and is connected to each of the first and second structural elements.

19. The fastening arrangement recited in claim 11, wherein the first structural element is a seat rail and the second structural element is a transverse beam of a floor in an aircraft.

20. The fastening arrangement recited in claim 19, wherein the floor is an intermediate floor.

* * * * *